United States Patent
Risk et al.

(10) Patent No.: US 7,437,491 B2
(45) Date of Patent: Oct. 14, 2008

(54) CLOCK AND DATA RECOVERY WHEREIN AN FB-DIMM IS CONNECTED TO SIGNAL PATH AND NULL AND SYNC FRAMES CONTROL THE FB-DIMM

(75) Inventors: Gabriel C. Risk, Palo Alto, CA (US); Dawei Huang, San Diego, CA (US); Jason H. Bau, Stanford, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 474 days.

(21) Appl. No.: 11/265,885

(22) Filed: Nov. 2, 2005

(65) Prior Publication Data
US 2007/0097264 A1    May 3, 2007

(51) Int. Cl.
*G06F 3/00* (2006.01)
*H04N 7/00* (2006.01)

(52) U.S. Cl. .............................. 710/61; 710/8; 710/30; 710/51; 710/52; 365/1

(58) Field of Classification Search .................... 710/8, 710/51–52, 61, 30
See application file for complete search history.

(56) References Cited

U.S. PATENT DOCUMENTS
6,195,393 B1 *   2/2001   Nemiroff et al. ........ 375/240.28
* cited by examiner

*Primary Examiner*—Tammara R Peyton
(74) *Attorney, Agent, or Firm*—Osha · Liang LLP

(57) ABSTRACT

Improved clock and data recovery involves transmitting one or more null frames prior to transmitting a sync frame. A receiving component detects for the sync frame to lock to a data signal sent on a signal path by a transmitting component. The one or more null frames transmitted prior to the sync frame results in a settling of the signal path prior to reception of the sync frame, thereby lessening or removing the effects of previously sent data on the sync frame.

12 Claims, 4 Drawing Sheets

CLOCK AND DATA RECOVERY WHEREIN AN FB-DIMM IS CONNECTED TO SIGNAL PATH AND NULL AND SYNC FRAMES CONTROL THE FB-DIMM

BACKGROUND

As shown in FIG. 1, a computer system 10 has at least one microprocessor 12 (also generally known as a "central processing unit" (CPU)) that is used to perform arithmetic and logic operations necessary for the function of the computer system 10. The microprocessor 12, in addition to possibly being connected to other microprocessors (not shown), may be connected to other types of integrated circuits (ICs) 14, 16, 18, 20. For example, one or more of the integrated circuits 14, 16, 18, 20 may be any one of an application-specific integrated circuit (ASIC), a field-programmable gate array (FPGA), and a logic gate. Moreover, as shown in FIG. 1, the integrated circuits 14, 16, 18, 20 may be connected to one another.

Although an integrated circuit, such as the microprocessor 12, may itself be provided with some limited capability for data storage (for example, in the form of a local cache memory), the computer system 10 typically has a main memory 22 that stores data for the computer system 10. Generally, the main memory 22 is accessible to the microprocessor 12 via a memory controller 24. The memory controller 24, serving as an interface between the microprocessor 12 and the main memory 22, manages the flow of data to and from the main memory 22. More specifically, the memory controller 24 receives requests for data from the microprocessor 12, interprets these requests, locates the requested data in the main memory 22, and provides the requested data to the microprocessor 12.

Communication between the various components shown in FIG. 1 involves sending data along wires or "traces" (generally referred to as "signal paths") (shown in FIG. 1, but not labeled) connecting the components. In such "wireline" communication, a data signal sent from a transmitting component to a receiving component may have a low voltage potential (hereinafter "low") or a high voltage potential (hereinafter "high") to represent a binary value of zero or one, respectively. The duration of the portion of a data signal representing a particular data value is referred to as the "bit time." In other words, the bit time represents the time during which a single binary value is transmitted. Those skilled in the art will note that the bit time is inversely proportional to the frequency of the data signal.

Generally, only a portion of a bit time is represented by a valid voltage potential. The remaining portion of the bit time is needed for any transitioning to another voltage potential. The portion of the bit time in which the binary value is valid is referred to as the "data eye."

As the operating frequencies of computer systems continue to increase as technology improves over time, the need to more rapidly transmit data between computer system components also increases. In some implementations, a clock signal is often sent to help recover the data signal (such communication is referred to as "source-synchronous" transmission). The clock signal is used to determine when the data signal should be latched by a receiving component.

FIG. 2 shows a source-synchronous interface 30 between two components 32, 34. A data signal 36 (via output buffer 40) and an associated clock signal 38 (collectively referred to as a "link") are transmitted from the transmitting component 32 to the receiving component 34. Those skilled in the art will note that although FIG. 2 shows only data signal 36 transmitted between components 32, 34, multiple data signals may be transmitted in parallel between components 32, 34.

Because the transmitted data signal 36 may attenuate or otherwise lose integrity during transmission, an input buffer 42 in the receiving component 34 may be used to regenerate the transmitted data signal 36 to valid voltage potentials. The buffered data signal 44 serves as an input to a latch 46. The latch 46 outputs a copy of the data signal 44 as a latched data signal 48 when a low-to-high transition on the transmitted clock signal 38 triggers the latch 46. In such a manner, the latch 46 recovers the transmitted data signal 36 using the transmitted clock signal 38.

Now also referring to FIG. 3, the transmitted clock signal 38 must sample data within the period of the corresponding data eye on the data signal 44. Otherwise, the correct data value may not be recovered.

As described above, source-synchronous transmission requires that a reference clock signal be transmitted with a data signal. In other implementations, however, it may be not be necessary to transmit a data signal and an associated clock signal from the same source. Those skilled in the art will note that when a data signal and an associated clock signal arrive from different sources, such transmission may be, for example, synchronous, mesochronous, plesiochronous, asynchronous, or a combination thereof.

While it is optimal for data on a data signal to always be sampled at the proper time, various real-world variations can cause a loss of integrity of a transmitted data signal, thereby potentially resulting in poor or inaccurate recovery of data at the receiving side. In view of this, clock and data recovery (CDR) techniques are often implemented to track variations and adjust data sampling accordingly. However, although CDR techniques aim to ensure that the proper data is sampled at the proper time, the ability for these techniques to properly sample data needs to be ever more precise as the data eye gets narrower due to increasing transmission frequencies.

SUMMARY

According to one aspect of one or more embodiments of the present invention, a computer system comprises: a first integrated circuit operatively connected to a signal path; and a second integrated circuit operatively connected to the signal path, where the first integrated circuit is capable of periodically transmitting a sync frame to the second integrated circuit along the signal path, and where the first integrated circuit is further capable of transmitting at least one null frame prior to transmission of the sync frame.

According to another aspect of one or more embodiments of the present invention, a method of performing computer system operations comprises: transmitting on a signal path a plurality of data frames; transmitting on the signal path a sync frame; transmitting on the signal path at least one null frame prior to the sync frame; sampling data in the plurality of data frames; detecting for the sync frame; and adjusting the sampling dependent on the detecting.

According to another aspect of one or more embodiments of the present invention, a computer system comprises: a memory controller operatively connected to a signal path and arranged to transmit a plurality of data frames interspersed with sync frames, the memory controller being further arranged to transmit at least one null frame prior to at least one sync frame; and an FB-DIMM operatively connected to the signal path, wherein the FB-DIMM is arranged to sample data in the plurality of data frames dependent on detection of the sync frames.

Other aspects and advantages of the invention will be apparent from the following description and the appended claims.

DETAILED DESCRIPTION

Figure 1:
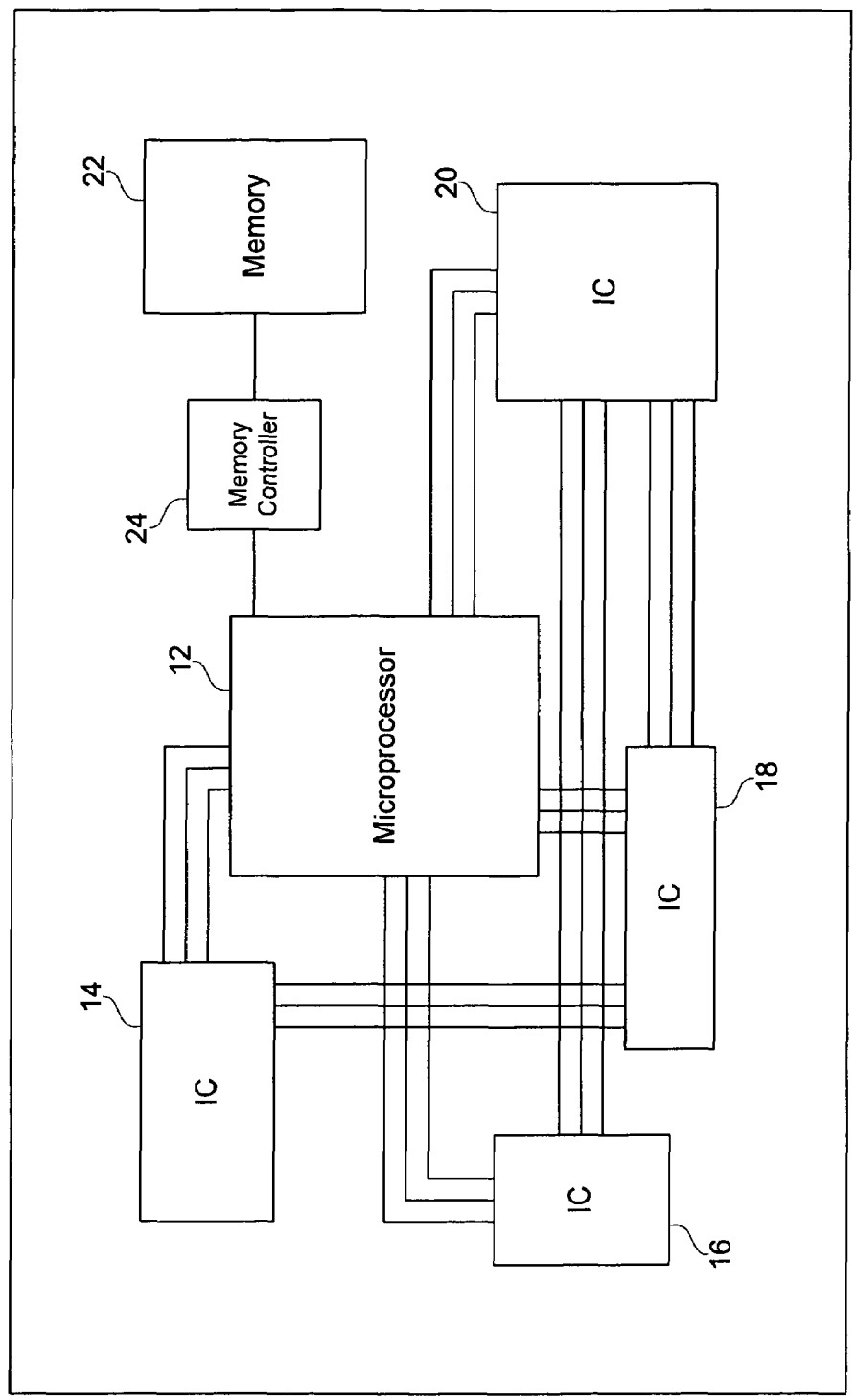
FIG. 1 shows a computer system.
Figure 2:
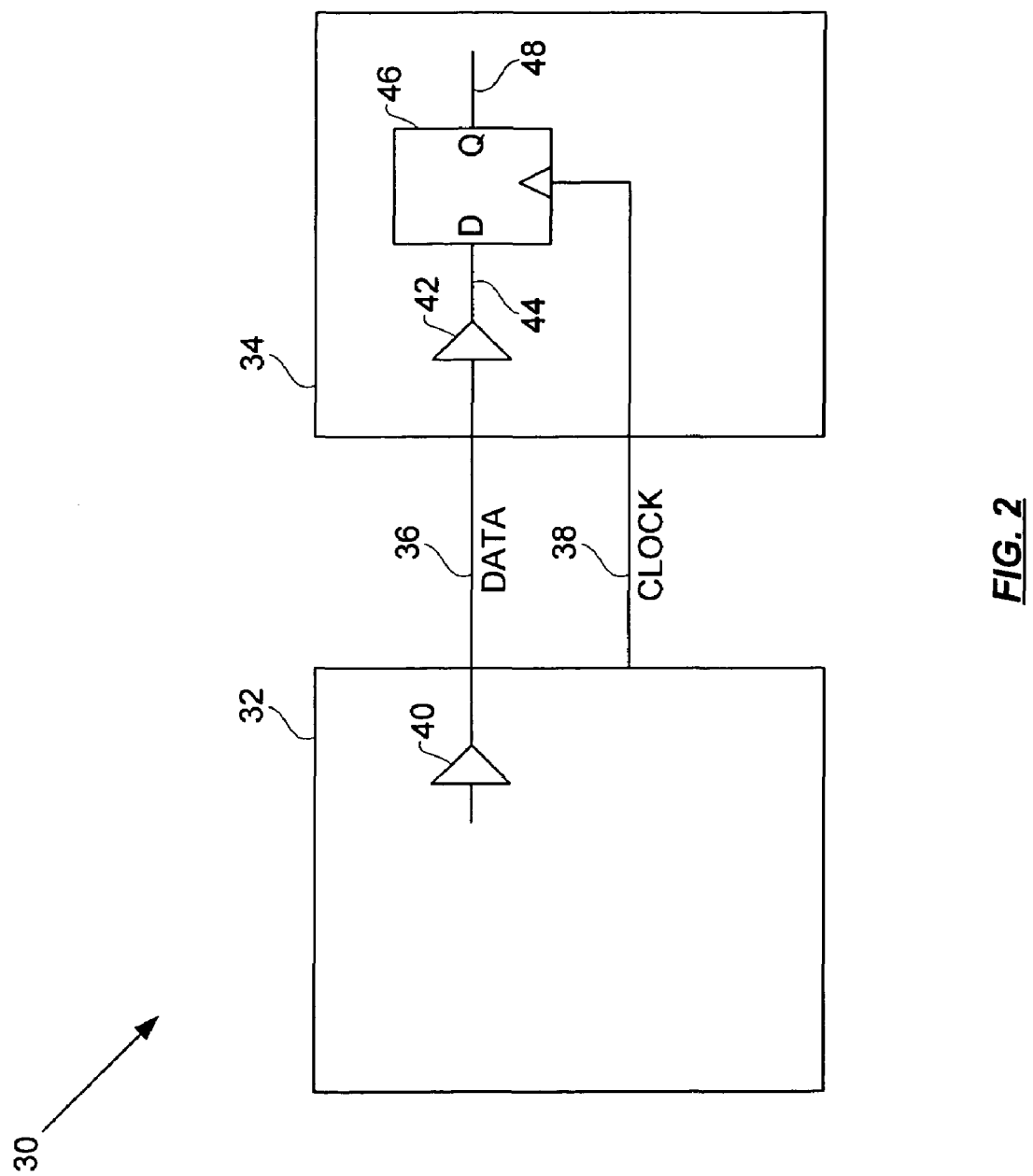
FIG. 2 shows a portion of a computer system.
Figure 3:
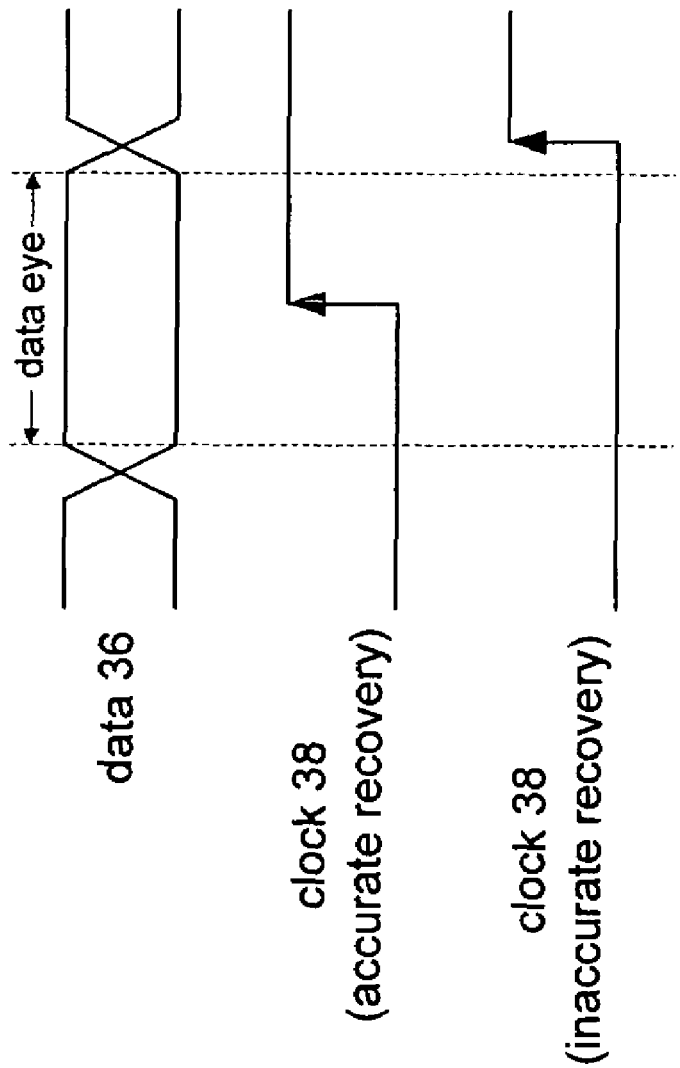
FIG. 3 shows a transmitted data signal and possible associated clock signals.

While the description above with reference to FIGS. 2 and 3 relates to an example of a memory interface in which multiple data signals may be transmitted in parallel, the description below with reference to FIG. 4 relates to an example of a memory interface in which data is transmitted serially. Particularly, FIG. 4 shows an interface between a memory controller 50 and a type of memory referred to as a "fully-buffered dual in-line memory module" (FB-DIMM) 52.

Figure 4:
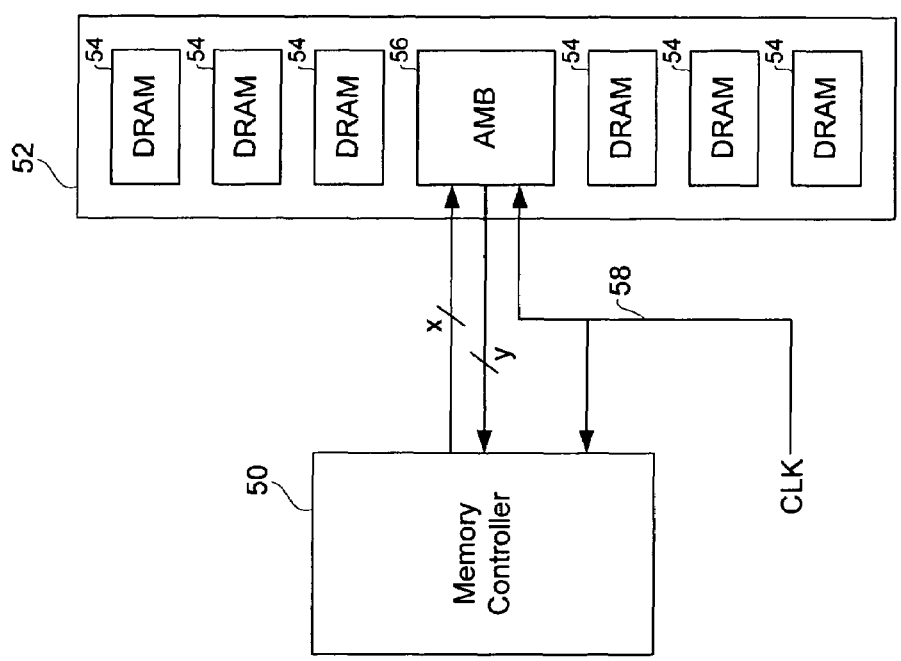
FIG. 4 shows an interface between a memory controller and memory.

In FIG. 4, the FB-DIMM 52 has a plurality of dynamic random access memory (DRAM) "chips" 54 and an advanced memory buffer (AMB) 56. Generally, the AMB 56 (i) delivers to the DRAM chips 54 read requests from a memory controller 50, (ii) receives read data from the DRAM chips 54 for subsequent transmission to the memory controller 50, and (iii) buffers and writes to the DRAM chips 54 write data from the memory controller 50.

Communication between the memory controller 50 and the AMB 56 involves x lines (e.g., 10 lines) for transmitting write data and read requests to the AMB 56 and y lines (e.g., 14 lines) for transmitting read data from the AMB 56 to the memory controller 50. Moreover, a global clock signal 58 is provided to the memory controller 50 and the FB-DIMM 52. However, those skilled in the art will note that the global clock signal 58 is not sent together with data from the memory controller 50. Further, those skilled in the art will note that additional FB-DIMMs (not shown) may be connected to the memory controller 50.

In the interface shown in FIG. 4, data on a data signal transmitted from the memory controller 50 is sampled by the AMB 56 using the transmitted data signal itself. Generally, the AMB 56 "locks" to the data signal based on recognizing a particular bit pattern transmitted on the data signal. Data bits are grouped in "frames," and after the transmission of every t frames, the memory controller 50 sends a "sync" frame which contains a particular bit pattern recognizable by the AMB 56. For example, after every 42 frames of 12 bits each, the memory controller 50 may send a sync frame having a bit pattern of "101010" for the last 6 bits in the sync frame. The AMB 56 essentially looks for the "101010" bit pattern, and upon detection of it, locks to the data signal accordingly, thereby training the AMB's 56 CDR, i.e., at least temporarily fixing the points for sampling data along the data signal.

Those skilled in the art will note that the integrity of a bit on a signal is dependent on bits previously sent. In other words, the energy on a signal wire is determined by the bits that were previously sent down the signal wire. Each bit causes a series of reflections/perturbations that can singly or cumulatively cause "jitter" (i.e., abrupt and unwanted variations of one or more signal characteristics, such as the interval between successive pulses, the amplitude of successive cycles, or the frequency or phase of successive cycles) on one or more later transmitted bits.

Those skilled in the art will note that the duration of reflections/perturbations caused by a transmitted bit is dependent on the properties of the signal wire. For example, in an interface such as that shown in FIG. 4, a transmitted bit may result in 5 to 10 nanoseconds of reflections/perturbations.

Referring again to FIG. 4, although the AMB 56 may only look for a particular bit pattern and ignore all other transmitted bits for purposes of locking to the data signal, the transmission of bits prior to the transmission of the particular bit pattern in the sync frame may cause jitter, thereby attenuating the quality and accuracy of the particular bit pattern itself. This may cause the AMB's 56 CDR to be trained inaccurately by locking to the data signal in a manner that improperly shifts the data sampling points. In other words, attenuation of the particular bit pattern in the sync frame due to jitter caused by previously sent bits may result in the AMB's 56 CDR sampling data at points not aligned with the centers of data eyes of the data signal. Such misalignment or an accumulation thereof may ultimately result in improper data sampling. For example, the misalignment may be such that the AMB 56 samples outside one or more particular data eyes.

Embodiments of the present invention relates to improved CDR. Generally, improved CDR behavior in accordance with one or more embodiments of the present invention is achieved by mitigating the effects of previously sent bits on bits in a sync frame.

Referring to FIG. 4, in one or more embodiments of the present invention, the memory controller 50 may transmit one or more "null" frames prior to transmission of the sync frame. A null frame contains no data. By sending one or more null frames prior to the sync frame, the corresponding signal wire is allowed to settle, thereby resulting in an attenuation of jitter on bits in the sync frame.

The determination of how many null frames to transmit before transmitting the sync frame may be channel- and/or system-dependent. For example, in one or more embodiments of the present invention, a simulation or other behavioral study may reveal that a transmitted bit causes 10 nanoseconds of reflections/perturbations. If a single null frame is 10 nanoseconds or longer in duration, then the use of one null frame prior to the sync frame is sufficient to allow the associated signal wire to settle before the sync frame. In one or more other embodiments of the present invention, if three null frames are necessary to span a simulated or expected duration of reflections/perturbations caused by a transmitted bit, then three null frames may be inserted before the sync frame to ensure settling prior to reception of the sync frame.

By ensuring that the data signal has settled prior to the sync frame, the AMB's 56 CDR is not shifted, and thus, subsequent sampling of data along the data signal occurs in alignment with the expected data eyes.

Those skilled in the art will note that by ensuring that the AMB's 56 CDR is subject to little or no movement, the data eyes on the data signal may be narrowed due to sampling occurring at centered alignment points in the data eyes. In other words, because the sampling points do not tend toward the ends of the data eyes and rather tend toward or along the centers of the data eyes, the data eyes may be narrowed. This allows for increased transmission frequency as more data may be sent over a given amount of time.

In one or more embodiments of the present invention, null frames may be inserted dynamically. For example, a memory controller 50 may "know" via programming that a particular bit pattern will result in a particular duration of jitter. In this case, the memory controller 50 will insert p null frames prior to the sync frame to mask the duration of that jitter. However, in subsequent transmission, the memory controller 50 may determine that another particular bit pattern will result in a different duration of jitter, in which case, the memory controller 50 will insert q null frames prior to the sync frame. In further transmission, the memory controller 50 may not even insert any null frames prior to the sync frame.

Those skilled in the art will note that while FIG. 4 shows an interface between a memory controller and a FB-DIMM, improved CDR in accordance with one or more embodiments of the present invention may be implemented in an interface between any two components. For example, improved CDR in accordance with one or more embodiments of the present invention may be implemented between a microprocessor and an FPGA.

Advantages of the present invention may include one or more of the following. In one or more embodiments of the present invention, improved CDR is achieved.

In one or more embodiments of the present invention, improved CDR may allow for increased transmission frequency.

In one or more embodiments of the present invention, a receiving component's CDR may be dependent on a sync frame only without adverse susceptibility to jitter caused by data sent before the sync frame.

In one or more embodiments of the present invention, because a receiving component's sync frame-dependent CDR is shifted less relative to that in cases where null frames are not sent prior to the sync frame, a timing budget's margin may increase.

In one or more embodiments of the present invention, because a receiving component's sync frame-dependent CDR is shifted less relative to that in cases where null frames are not sent prior to the sync frame, the robustness of the receiving component may increase.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
    a first integrated circuit operatively connected to a signal path; and
    a second integrated circuit operatively connected to the signal path,
    wherein the first integrated circuit is capable of periodically transmitting a sync frame to the second integrated circuit along the signal path,
    wherein the first integrated circuit is further capable of transmitting at least one null frame prior to transmission of the sync frame, and
    wherein the second integrated circuit one of forms and is part of a FB-DIMM.

2. The computer system of claim 1, wherein the sync frame comprises a predetermined bit pattern recognizable by the second integrated circuit.

3. The computer system of claim 1, wherein the null frame comprises no data.

4. The computer system of claim 1, wherein the second integrated circuit is capable of aligning sampling points of data transmitted on the signal path dependent on the sync frame.

5. The computer system of claim 1, wherein the first integrated circuit comprises a memory controller.

6. The computer system of claim 1, wherein the first integrated circuit is further capable of transmitting the at least one null frame dynamically.

7. A computer system, comprising:
    a memory controller operatively connected to a signal pat and arranged to transmit a plurality of data frames interspersed with sync frames, the memory controller being further arranged to transmit at least one null frame prior to at least one sync frame; and
    an FB-DIMM operatively connected to the signal path,
    wherein the FB-DIMM is arranged to sample data in the plurality of data frames dependent on detection of the sync frames.

8. The computer system of claim 7, the FB-DIMM comprising:
    a buffer operatively connected to the signal path; and
    a plurality of DRAMs operatively connected to the buffer.

9. The computer system of claim 7, wherein the sync frames comprise a predetermined bit pattern.

10. The computer system of claim 7, wherein the at least one null frame comprises no data.

11. The computer system of claim 7, wherein the memory controller is further arranged to dynamically transmit the at least one null frame.

12. The computer system of claim 7, wherein the memory controller is further arranged to transmit the at least one null frame dependent on behavior of simulated transmitted data.

* * * * *

UNITED STATES PATENT AND TRADEMARK OFFICE
CERTIFICATE OF CORRECTION

PATENT NO. : 7,437,491 B2 Page 1 of 1
APPLICATION NO. : 11/265885
DATED : October 14, 2008
INVENTOR(S) : Gabriel C. Risk et al.

It is certified that error appears in the above-identified patent and that said Letters Patent is hereby corrected as shown below:

In the Claims:

In Claim 7, column 6, line 24, the word "pat" should be --path--.

Signed and Sealed this

Thirtieth Day of December, 2008

JON W. DUDAS
*Director of the United States Patent and Trademark Office*